United States Patent [19]
Talbert et al.

[11] Patent Number: 5,097,819
[45] Date of Patent: Mar. 24, 1992

[54] DISPERSED BUBBLE CONDENSATION

[75] Inventors: Sherwood G. Talbert; Anthony C. DeVuono; Richard N. Christensen, all of Columbus; Paul E. George, II, Dublin, all of Ohio

[73] Assignee: Gas Research Institute, Chicago, Ill.

[21] Appl. No.: 719,237

[22] Filed: Jun. 24, 1991

[51] Int. Cl.[5] .............................................. F24H 3/02
[52] U.S. Cl. .............................. 126/110 R; 126/99 R; 126/116 R; 165/111; 261/124; 261/153
[58] Field of Search .............. 126/110 R, 99 R, 116 R, 126/109, 99 A, 113, 101, 99 C, 116 A, 116 B, 106; 122/20 B; 261/153, 124, 151; 165/111; 237/53, 55

[56] References Cited

U.S. PATENT DOCUMENTS

| | | | |
|---|---|---|---|
| 4,340,572 | 7/1982 | Ben-Shmuel et al. | 261/151 |
| 4,515,145 | 5/1985 | Tallman et al. | 126/110 R |
| 4,561,421 | 12/1985 | Hwang et al. | 126/110 R |
| 4,601,654 | 7/1986 | Kitchen | 126/116 R |
| 4,603,681 | 8/1986 | Clawson | 126/110 R |
| 4,621,686 | 11/1986 | Ahn | 165/111 |
| 4,681,085 | 7/1987 | Clawson | 126/110 R |
| 4,799,941 | 1/1989 | Westermark | 261/153 |

*Primary Examiner*—James C. Yeung
*Attorney, Agent, or Firm*—Watkins, Dunbar & Pollick

[57] ABSTRACT

A direct contact condensing heat-exchanger is provided with a water heat transfer medium in which combustion product gases are dispersed in finely divided bubble form against a relatively low hydrostatic pressure differential for efficient sensible heat and latent heat recovery purposes. In one actual application, a warm-air furnace system having a burner that produces combustion product gases as a heat source is provided with the novel direct contact condensing heat-exchanger as a secondary heat-exchanger that advantageously recovers both sensible heat and latent heat from the combustion product gases.

21 Claims, 2 Drawing Sheets

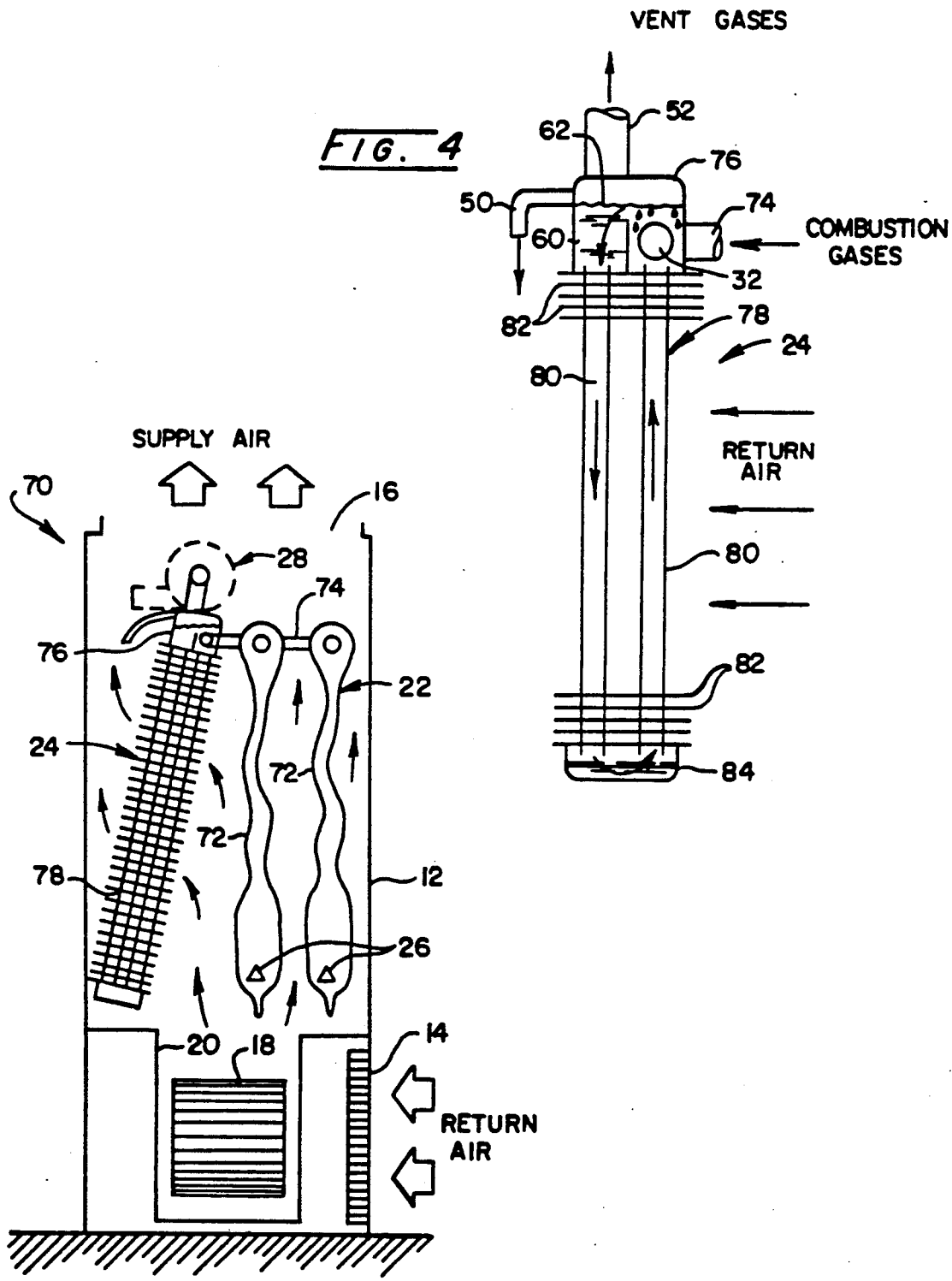

5,097,819

DISPERSED BUBBLE CONDENSATION

FIELD OF THE INVENTION

This invention relates generally to heat transfer, and particularly concerns a novel direct contact heat exchanger which effectively recovers useful sensible heat and latent heat from a combustion product exhaust stream and which may be advantageously incorporated into a heating system such as a warm-air furnace system to thereby improve system overall heat recovery efficiency.

BACKGROUND OF THE INVENTION

Warm-air furnace systems are well-known and generally recover useful sensible heat from system combustion product gases using at least one or more system elements which extract varying degrees of available heat. In some instances the well-known systems recover sensible heat from combustion product gases flowing through system combustor elements or in a system firepot element submerged in the system stream of warm-air. Also, such systems may utilize one or more heat-exchanger or heat-exchanger-like elements to obtain additional sensible heat from the system combustion product gases for transfer to the system stream of warm-air. Such systems, however, have not been known to advantageously extract available latent heat from the flow of system combustion product gases and utilize that heat to pre-heat the system airflow stream prior to the airflow stream being additionally heated by the system primary sensible heat source or sources.

For examples of known heating systems which do recover latent heat from system combustion product gases but which do not utilize that heat for airstream pre-heat purposes see U.S. Pat. No. 4,340,572 issued in the name of Ben-Shmuel et al., U.S. Pat. No. 4,799,941 issued in the name of Westermark, and U.S. Pat. No. 4,919,085 issued in the name of Kaisha.

Also, conventional warm-air furnace systems wherein latent heat is recovered from combustion product gases to increase system thermal efficiency are well-known but such systems do not advantageously utilize a direct contact condensing heat exchanger for that purpose. By way of example refer to the Amana "Air Command 90" furnace system.

SUMMARY OF THE INVENTION

The present invention may be combined with several other apparatus elements to provide useful heat to a warm-air furnace system airflow stream which is normally received in a relatively cool condition at a return air inlet and discharged in a heated condition at the system supply air outlet. Such airflow stream is first heated (pre-heated) at a secondary heat exchanger which, by bubbling the combustion product gases from the primary heat exchanger directly through a bubble distributor submerged in a water medium, recovers both sensible heat and latent heat from such combustion product gases at higher efficiencies for transfer to the furnace system airflow stream. Afterwards, the airflow stream is further heated to its desired exchanger element, such as a system burner element, or system pulsed combustor element, or system tubular tailpipe element, submerged in the airflow stream in down-stream relation to the system secondary heat exchanger element. The referenced secondary direct contact condensing heat exchanger is provided with an initial charge of water medium which is supplemented from cycle to cycle automatically during operation of the warm-air furnace system by water condensed from the combustion product gases when such gases are finely divided into small bubbles for direct contact with and cooling by the water medium charge. Such finely divided combustion product gases are bubbled through the water medium at a relatively low static pressure differential (e.g., 1 to 3 inches of water) and are then separated from the medium for discharge from the system to the outdoors in an essentially water-free but saturated and relatively cool condition. Also, the secondary heat exchanger is constructed in a manner whereby convection and bubbling forces automatically recirculate the water medium heated by combustion product gas bubbles in a continuous loop principally comprised of heat exchanger tubes or tube and fin elements that are submerged in the system airflow stream and that transfer the acquired combustion product gas sensible and latent heats to the airflow stream. The magnitude of the desired relatively low hydrostatic pressure head differential through which combustion product gases are bubbled is essentially controlled by proper design and placement of the system bubble distributor and the secondary heat-exchanger water medium overflow discharge element relative to each other and relative to the physical locations of the included heat-exchanger tubes or tube and fin elements.

DESCRIPTION OF THE DRAWINGS

FIG. 3 is a schematic elevational view of another embodiment of a warm-air furnace system incorporating another form of direct contact condensing heat exchanger condensing of this invention.

FIG. 4 is a schematic enlarged view of the direct contact condensing heat-exchanger element with submerged bubble distributor incorporated in the system of FIG. 3.

DETAILED DESCRIPTION OF THE INVENTION

Figure 1:
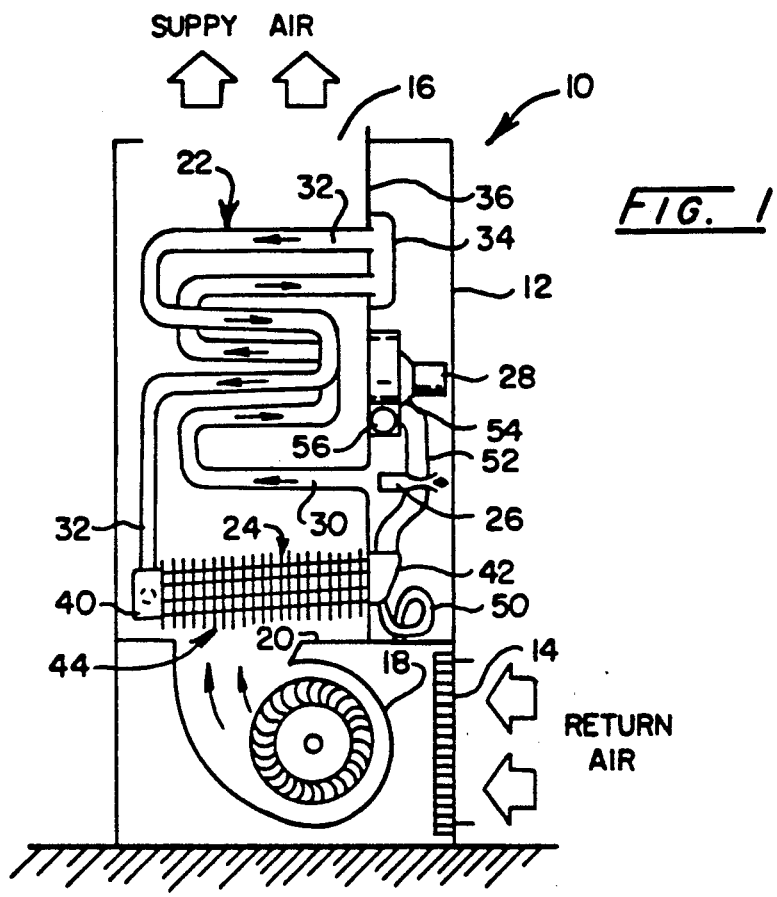
FIG. 1 is a schematic elevational view of a preferred embodiment of the warm-air furnace system incorporating the direct contact condensing heat-exchanger of this invention.

FIG. 1 schematically illustrates a warm-air furnace system 10 constructed in accordance with the present invention. System 10 has an outer casing or housing 12 which in part functions as a conduit for the system airflow stream which is received as return air at inlet opening/filter combination 14 and which, after heating within casing 12, is discharged at outlet opening 16 as warmed supply air. In a typical residential-type warm-air furnace system 10 the airstream received at inlet opening 14 has a temperature in the range of 65° F. to 70° F.; heated air discharged through outlet opening 16 typically has a temperature in the range of 120° F. to 160° F. The prime mover for the system airflow stream is a conventional electric motor-driven centrifugal blower 18 located in the compartment area defined by housing 12 and the compartment wall designated 20.

Also located within housing 12 is a primary heat-exchanger 22, a secondary heat-exchanger 24, a burner assembly 26, and an induced draft exhaust fan or blower 28. Fuel, preferably natural gas, propane, butane, or the like, is burned by the burner assembly 26 using combustion air induced from the atmosphere. The combustion product gases produced by burner assembly 26, which alternatively may be a conventional pulsed combustor, are preferably introduced into heat-exchanger 22 by induction due to the suction effect of induced draft exhaust blower 28.

In the FIG. 1 embodiment, heat-exchanger 22 is comprised of serpentine-like metal tube elements 30 and 32 which are joined together through a header 34 mounted on compartment wall 36. During furnace system operation the combustion product gases flowed into tube 30 may have a typical temperature to as high as 2,000° F. to 2,500° F. Sufficient tube surface area is provided in the primary heat-exchanger tubes 30 and 32 to cool the combustion product gases to a temperature preferably no greater than approximately 450° F. to 500° F. at the point such gases are flowed into the header 40 and bubble distributor of secondary heat-exchanger 24. Tube elements 30 and 32, and header 34, are preferably made of a conventional corrosion-resistant alloy metal such as Type 316 or Type 409 stainless steel.

Secondary heat-exchanger 24, which is located upstream of primary heat-exchanger 22 relative to system direction of air flow, receives the combustion product gases at its inlet header element 40. Secondary heat-exchanger 24 is further comprised of an outlet header/separator element 42 which is cooperatively joined to header element 40 by a bank 44 of tube elements 46 and 47 (FIG. 2) which may or may not be combined with metal fin elements 48 (also FIG. 2) depending upon the adequacy of tube heat transfer surface. Whereas heat-exchanger 22 extracts only sensible heat from the system combustion product gases, secondary heat-exchanger 24 recovers both sensible heat and latent heat from these gases because of its improved heat transfer capability throughout a relatively lower gas temperature range. Normally, the maximum temperature obtained in heat-exchanger 24 is no greater than approximately 120° F. and preferably no more than approximately 100° F. to 110° F. at the point of gas/water-medium separation which occurs in header/separator element 42. The obtained water medium temperature should be below the dewpoint temperature of the combustion product gas mixture produced by burner assembly 26.

As shown in FIG. 1, system 10 also is provided with an overflow drain element 50 and with a conduit 52 which directs combustion product gases separated at outlet header/separator 42 to inlet 54 of induced draft blower assembly 28. Outlet 56 of blower assembly 28 is normally vented to the exterior atmosphere through a plastic resin pipe.

Figure 2:
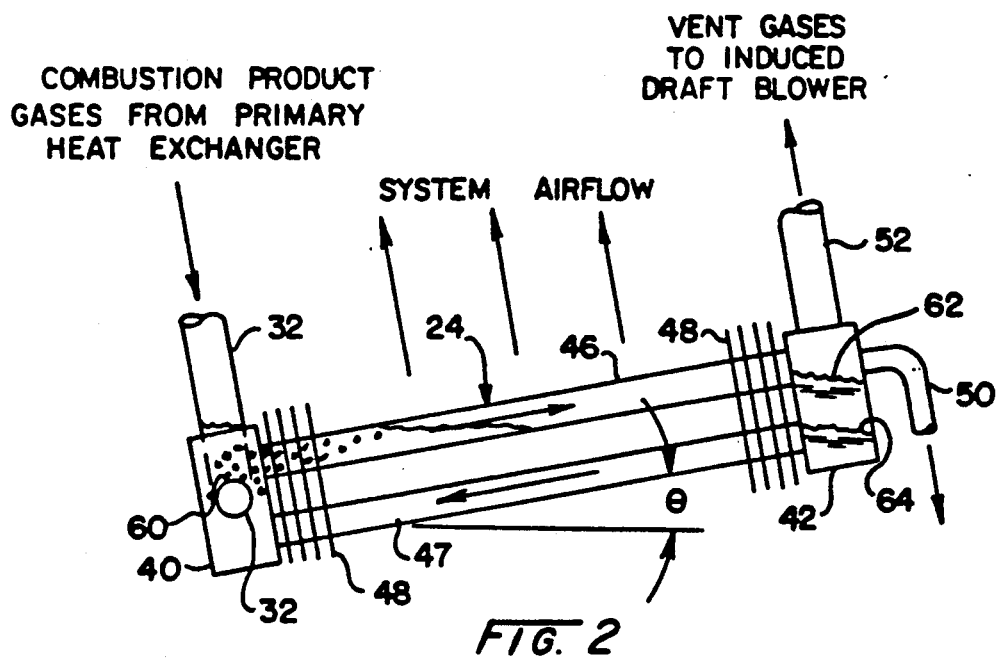
FIG. 2 is a schematic enlarged view of the direct contact heat-exchanger element with submerged bubble distributor incorporated in the system of FIG. 1.

Referring to FIG. 2, tube 32 of heat-exchanger 22 terminates interiorly of heat-exchanger header 40 in the form of a horizontally-oriented bubble distributor section (32) and is provided with a plurality of small perforations or holes in the distributor section to permit combustion product gases to escape from within tube 32 in finely divided bubble form and into direct contact with the water heat transfer medium 60 which is initially charged into element 24. The hydrostatic pressure differential encountered at the bubble distributor perforations is preferably no more than approximately 1-3 inches of water. In one actual embodiment of bubble distributor section 32 we provided approximately 80 perforations of approximately ⅛ inch diameter essentially uniformly spaced apart over the effective horizontal length of the section.

The released small gas bubbles flow vertically upwardly through the water heat transfer medium 60 and produce a surging slug flow or plug of liquid and gas through the upper row of tube elements 46. The so-flowed gas bubbles give up both sensible heat and latent heat to the heat transfer process and are separated from medium 60 at is upper surface 62 during operation of the furnace system. The liquid recirculates from upper header 42 to the lower header 40 through the lower row of tube elements 47. The positioning of surface 62 is controlled by the positioning of the inlet of drain tube element 50 to produce the desired flow characteristics and the maximum hydrostatic head (e.g., 1 to 3 inches of water) between the level of the bubble-forming perforations of the generally horizontal bubble distributor tube 32 within inlet header 40 and the upper level 62 of medium 60 during system activation. In one embodiment of heat-exchanger 24 an angle of inclination of tubes 46 and 47 relative to horizontal of approximately 10° was adequate to achieve desired heat transfer and yet provide for proper bubbling and water recirculation as well as ready gas separation from medium 60 within header/separator element 42. During such heat transfer and separation processing a continuous loop-like recirculation of medium 60 occurs within heat-exchanger 24 with medium flow being in the directions shown in FIG. 2. In constructing heat-exchanger 24 we suggest use of a molded high-temperature rigid resin material for forming header element 40 and use of a molded relatively lower-temperature rigid resin material for forming header/separator element 42. Tube elements 46 and 47 may be fabricated of an aluminum metal alloy or other suitable material and pressure expanded into fin elements 48 to form a tube-fin bank 44 and tube-header contacting relationships.

FIG. 3 schematically illustrates a warm-air furnace system alternate embodiment 70 which also utilizes the present invention. Those elements which are in form and function substantially similar to like components of system 10 are identified by the same reference numerals used in FIGS. 1 and 2. In the FIG. 3 scheme, primary heat-exchanger 22 is comprised of conventional clam-shell-type heat transfer elements 72 through which the combustion product gases generated by burners 26 are flowed to and through header element 74 to the bubble distributor 32 located in the baffled inlet header/separator element 76 of heat exchanger 24. The baffle in heat-exchanger 24 is designated as 79 in FIG. 4. Heat-exchanger 24 of FIG. 3 is comprised of a vertical or near-vertical bank 78 of tube elements 80 (FIG. 4) which may or may not be combined with metal fin elements 82 (also FIG. 4). However, the tube bank 78 could be arranged at any angle between horizontal and vertical, although the inlet header 76 would remain in approximately the position shown in FIGS. 3 and 4. A lower header 84 interconnects the lower extremes of tube elements 80, although U-bends could be used on each tube. Again, and as in the case of the FIGS. 1 and 2 embodiment, system 70 functions to transfer sensible heat and latent heat from the system stream of combustion product gases to the system airflow stream with an improved degree of heat or energy recovery (thermal efficiency), and achieves such through the bubbling of finely divided combustion product gases through the initial charge of water heat transfer medium 60 within the system secondary heat exchanger 24. Also, in the FIG. 3 system embodiment 70 primary heat-exchanger 22 and secondary heat-exchanger 24 function in an airstream parallel airflow relationship relative to each other, rather than in an upstream-downstream series relationship as in FIG. 1.

In the FIG. 2 arrangement the gas bubbles flow from the submerged bubble distributor section, and both liquid and gas circulate through the upper row or tier of heat-exchanger heat transfer tube elements. In the FIG. 4 arrangement the gas bubbles also flow from the submerged distributor section, but the attendant bubble-lift action in the outlet header causes only the liquid to circulate through the different rows or tiers of heat transfer tube elements 80, which may be oriented at any angle between vertical and horizontal. In both designs, however, rapid heat transfer occurs as the bubbles form because the hot gases are in direct contact with heat-transfer medium 60.

Although two preferred embodiments of the invention have been herein described, it will be understood that various changes and modifications in the illustrated described structure can be effected without departure from the basic principles of the invention. Changes and modifications of this type are therefore deemed to be circumscribed by the spirit and scope of this invention defined by the appended claims or by a reasonable equivalence.

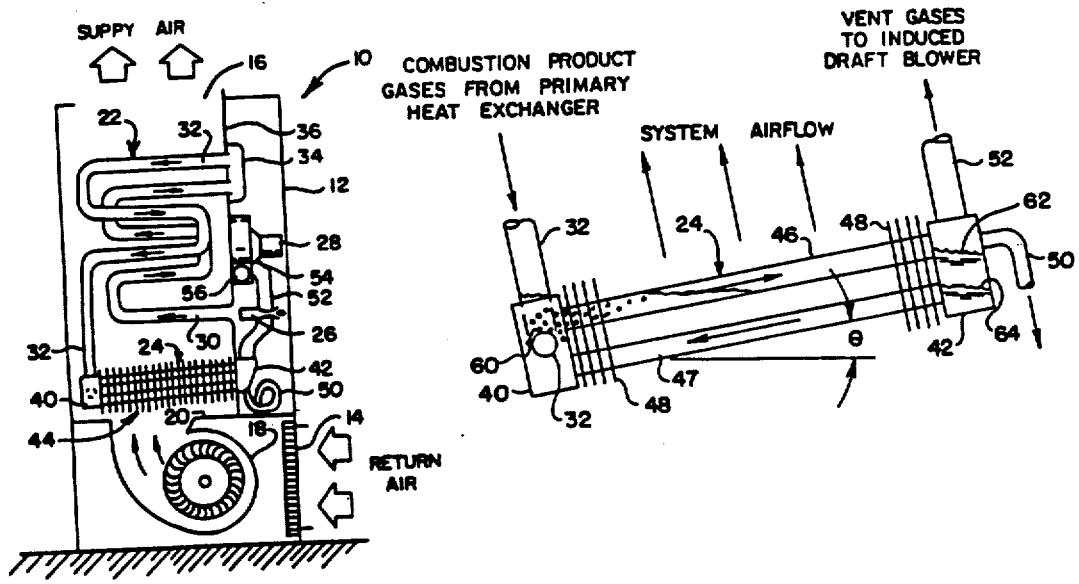

We claim:

1. A direct contact heat-exchanger for condensing water and recovering both sensible and latent heat from combustion product gases, and comprising:
   a.) an inlet header means having a combustion product gas inlet and an interiorly-contained essentially horizontal combustion product gas bubble distributor,
   b.) an outlet header means having a combustion product gas outlet and a continuously-open drain outlet for removal of water condensate,
   c.) heat-transfer tube element means cooperably connecting said inlet header means to said outlet header means, and
   d.) a water heat transfer medium contained and circulated within said inlet header means, said outlet header means, and said heat transfer tube element means, said inlet header means gas bubble distributor having a plurality of perforations whereby combustion product gases flowed into said gas bubble distributor from said inlet header means combustion product gas inlet are distributed in finely divided bubble form into said water heat transfer medium against a hydrostatic pressure differential essentially defined by the vertical distance between said plurality of perforations and said outlet header means continuously-open drain outlet.

2. The heat-exchanger defined by claim 1 wherein said hydrostatic pressure differential is in the range of 1 inch to 3 inches of water column.

3. The heat-exchanger defined by claim wherein said water heat transfer medium is inherently continuously circulated in a loop-like path through said heat-transfer tube elements when combustion product gases are bubbled into said water heat-transfer medium from said inlet header means combustion product gas bubble distributor.

4. The heat-exchanger defined by claim 3 wherein said heat-transfer tube element means is oriented in a substantially inclined position relative to a horizontal reference orientation.

5. The heat exchanger defined by claim 4 wherein said heat-transfer tube element means is oriented at an angle in the range of approximately 5° to 15° relative to said horizontal reference orientation. path through said tube elements and through said joined header means.

6. The heat exchanger defined by claim 3 wherein said heat-transfer tube element means is oriented in a substantially vertical direction relative to a horizontal reference orientation.

7. The heat-exchanger defined by claim 1 wherein said inlet header means and said outlet head means are joined into a header means unit, and wherein a contained baffle means extending only to below the surface of said water heat transfer medium enhances inherent continuous water heat transfer medium recirculated flow in a loop-like path through said tube elements and through said joined header means.

8. The heat-exchanger defined by claim 7 wherein said heat-transfer tube element means is oriented in a substantially horizontal direction relative to a horizontal reference direction.

9. A warm-air furnace system comprising:
   a.) burner means producing heated combustion product gases;
   b.) primary heat-exchanger means submerged in a furnace system airflow airstream and recovering sensible heat from said burner means heated combustion product gases for transfer to said airflow airstream; and
   c.) secondary heat exchanger means submerged in a furnace system airflow airstream and recovering sensible heat and latent heat from said burner means heated combustion product gases for transfer to said airflow airstream;
   said secondary heat exchanger means having a water heat transfer medium through which said burner means heated combustion product gases are directly bubbled and dispersed in finely divided form against a relatively low hydrostatic pressure differential for recovery of both sensible and latent heat from said burner means combustion product gases.

10. The system defined by claim 9 wherein said secondary heat exchanger means water heat transfer medium dispersion hydrostatic pressure differential is in the range of approximately 1 inches to 3 inches of water column.

11. The system defined by claim 9 wherein said primary heat exchanger means and said secondary heat exchanger means are in airflow airstream series relationship to each other, said primary heat exchanger means being downstream in airflow relation relative to said secondary heat exchanger means.

12. The system defined by claim 9 wherein said secondary heat exchanger means continuously recirculates, in a loop-like path, said water heat transfer medium during recovery of sensible and latent heat from said burner means combustion product gases.

13. The system defined by claim 9 and further comprised of continuously open drain means cooperating with said secondary heat exchanger means, the elevational position of said continuously open drain means establishing the upper limit of said secondary heat exchanger means water heat transfer medium hydrostatic pressure differential.

14. The system defined by claim 13 wherein inclined tube-like heat transfer elements being oriented at an angle in the range of approximately 5° to 15° relative to horizontal.

15. The system defined by claim 9 wherein said secondary heat exchanger means is further comprised of an inlet header means, an outlet header means, and tube-like heat transfer elements connecting said inlet header means to said outlet header means, said heat exchanger means water heat transfer medium being continuously recirculated in a loop-like path comprised of said tube-like heat transfer elements and said inlet and outlet header means.

16. The system defined by claim 15 wherein said tube-like heat transfer elements are oriented in a substantially inclined position relative to a horizontal reference orientation.

17. The system defined by claim 15 wherein said inlet header means and said outlet header means are joined into a header means unit, and wherein a contained baffle means extending only to below the surface of said water heat transfer medium enhances inherent continuous water heat transfer medium recirculated flow in a loop-like path through said tube-like heat transfer elements and through said header means unit.

18. The system defined by claim 17 wherein said heat-transfer tube-like elements are oriented in a substantially horizontal direction relative to a horizontal reference direction.

19. The system defined by claim 15 wherein said tube-like heat transfer elements are oriented in a substantially vertical position relative to a horizontal reference orientation.

20. A method of increasing the thermal efficiency of a system having a burner means that produces heated combustion product gases and a primary heat-exchanger means that receives said combustion product gases, recovers sensible heat from said combustion product gases, and transfers said sensible heat to a furnace system airflow airstream, comprising the steps of:

a.) flowing said combustion product gases from said primary heat-exchanger means to and into a secondary heat exchanger means having a water heat transfer medium;

b.) flowing said combustion product gases through said secondary heat-exchanger means water heat transfer medium in finely divided bubble form and against a relatively low hydrostatic pressure differential to transfer sensible heat and latent heat from said combustion product gases into said water heat transfer medium; and c.) transferring heat from said water heat transfer medium to said system airflow exchanger means.

21. A method of increasing the thermal efficiency of a heat-exchanger which receives combustion product gases by the recovery of both sensible heat and latent heat from said combustion product gases, comprising the steps of:

a.) providing a water heat transfer medium contained within a heat transfer surface;

b.) flowing said combustion product gases into said heat transfer medium in finely divided bubble form against a relatively low hydrostatic pressure differential;

c.) recovering both sensible heat and latent heat from said flowed combustion product bubble-form gases by transfer into said water heat transfer medium; and d.) subsequently separating said flowed combustion product gases from said water heat transfer medium and from included water condensed from said combustion product gases, said combustion product gases being flowed against a hydrostatic pressure differential in the range of approximately from 1 inch to 3 inches of water column.

* * * * *

UNITED STATES PATENT AND TRADEMARK OFFICE
CERTIFICATE OF CORRECTION

PATENT NO. : 5,097,819

DATED : Mar. 24, 1992

INVENTOR(S) : Talbert et al

It is certified that error appears in the above-identified patent and that said Letters Patent is hereby corrected as shown below:

Column 5, line 58   after the word "claim", insert the numeral "1"

Patent cover page, left caption for right hand drawing should read "COMBUSTION PRODUCT GASES FROM PRIMARY HEAT EXCHANGER" as shown on attached sheet.

Signed and Sealed this

Twenty-third Day of March, 1993

Attest:

STEPHEN G. KUNIN

Attesting Officer

Acting Commissioner of Patents and Trademarks

United States Patent [19]

Talbert et al.

[11] Patent Number: 5,097,819
[45] Date of Patent: Mar. 24, 1992

[54] DISPERSED BUBBLE CONDENSATION

[75] Inventors: Sherwood G. Talbert; Anthony C. DeVuono; Richard N. Christensen, all of Columbus; Paul E. George, II, Dublin, all of Ohio

[73] Assignee: Gas Research Institute, Chicago, Ill.

[21] Appl. No.: 719,237

[22] Filed: Jun. 24, 1991

[51] Int. Cl.⁵ .................................... F24H 3/02
[52] U.S. Cl. .......................... 126/110 R; 126/99 R; 126/116 R; 165/111; 261/124; 261/153
[58] Field of Search ............ 126/110 R, 99 R, 116 R, 126/109, 99 A, 113, 101, 99 C, 116 A, 116 B, 106; 122/20 B; 261/153, 124, 151; 165/111; 237/53, 55

[56] References Cited

U.S. PATENT DOCUMENTS

| | | | |
|---|---|---|---|
| 4,340,572 | 7/1982 | Ben-Shmuel et al. | 261/151 |
| 4,515,145 | 5/1985 | Tallman et al. | 126/110 R |
| 4,561,421 | 12/1985 | Hwang et al. | 126/110 R |
| 4,601,654 | 7/1986 | Kitchen | 126/116 R |
| 4,603,681 | 8/1986 | Clawson | 126/110 R |
| 4,621,686 | 11/1986 | Ahn | 165/111 |
| 4,681,085 | 7/1987 | Clawson | 126/110 R |
| 4,799,941 | 1/1989 | Westermark | 261/153 |

Primary Examiner—James C. Yeung
Attorney, Agent, or Firm—Watkins, Dunbar & Pollick

[57] ABSTRACT

A direct contact condensing heat-exchanger is provided with a water heat transfer medium in which combustion product gases are dispersed in finely divided bubble form against a relatively low hydrostatic pressure differential for efficient sensible heat and latent heat recovery purposes. In one actual application, a warm-air furnace system having a burner that produces combustion product gases as a heat source is provided with the novel direct contact condensing heat-exchanger as a secondary heat-exchanger that advantageously recovers both sensible heat and latent heat from the combustion product gases.

21 Claims, 2 Drawing Sheets